United States Patent [19]

Godfrey

[11] 4,299,745
[45] Nov. 10, 1981

[54] MULTI-COMPONENT HOT-MELT ADHESIVES

[75] Inventor: Darryl A. Godfrey, Longview, Tex.

[73] Assignee: Eastman Kodak Company, Rochester, N.Y.

[21] Appl. No.: 138,049

[22] Filed: Apr. 7, 1980

[51] Int. Cl.³ .................. C08L 23/26; C08L 31/04
[52] U.S. Cl. .................. 260/28.5 AV; 260/27 EV; 525/74; 525/193; 525/222; 525/78; 525/81
[58] Field of Search .................. 525/74, 193, 222, 78, 525/80, 81; 260/28.5 AV, 27 EV

[56] References Cited

U.S. PATENT DOCUMENTS

| 3,468,978 | 9/1969 | Battersby | 525/222 |
|---|---|---|---|
| 3,644,254 | 2/1972 | Dew | 525/222 |
| 3,658,948 | 4/1972 | McConnell | 525/74 |
| 3,856,889 | 12/1974 | McConnell | 525/74 |
| 3,868,433 | 2/1975 | Bartz et al. | 525/193 |
| 3,886,234 | 5/1975 | Ishihara et al. | 525/193 |

Primary Examiner—Carman J. Seccuro
Attorney, Agent, or Firm—Clyde L. Tootle; Daniel B. Reece, III

[57] ABSTRACT

The hot-melt adhesives of the present invention comprise a blend of ethylene-vinyl acetate copolymers, tackifier resin, modified polyethylene and microcrystalline wax. These hot-melt adhesive compositions provide adhesives having a novel combination of properties such as high tensile, low elongation and good bonding properties for adhering polyethylene film to nonwoven substrates such as disposable diapers.

8 Claims, No Drawings

MULTI-COMPONENT HOT-MELT ADHESIVES

This invention relates to hot-melt adhesive compositions having a novel combination of properties. More specifically, the invention relates to hot-melt adhesive compositions comprising a blend of ethylene vinyl acetate copolymers, tackifier resin, modified polyethylene and microcrystalline wax which provide an adhesive having high tensile strength and low elongation for the bonding of polyethylene film and nonwoven substrates.

Hot-melt adhesives produce a bond by mere cooling as distinguished from crosslinking or other chemical reactions. Prior to heating, the hot-melt adhesives are solids that can be prepared in bulk or pellet form for ease of handling. Upon heating, the hot-melt adhesive composition melts and flows freely for application to a substrate. Since the hot-melt adhesives of the present invention are thermoplastic rather than thermosetting, and thus remeltable, they can be applied to a particular substrate and later remelted to form a hot-melt bond between this substrate and another substrate.

The use for hot-melt adhesives are unlimited, however, it has been found that while one hot-melt may be used for bonding in a particular use or application, the adhesive may be completely unsuitable for other uses or applications. Therefore, one particular hot-melt adhesive which will be excellent for bonding paper and cardboard does not form acceptable bonds between rubber and metals, for example. Moreover, some uses for hot-melts require that the adhesive provide satisfactory bonds between different substrates, which may be the same or different, but the bonds must be flexible and have adhesive elongation for such uses as hot-melt adhesives used in making disposal diapers.

In accordance with the present invention, I have found that a blend comprising ethylene vinyl acetate copolymers, tackifier resin, modified polyethylene and microcrystalline wax, provides a hot-melt adhesive having a novel combination of properties. This adhesive provides strong bonds between polyethylene films and nonwoven substrates. When all four adhesive components are present, the adhesive has a low viscosity and provides bonds which have high tensile strength and low elongation (less than 100%).

The ethylene-vinyl acetate copolymers useful in the practice of this invention may contain from about 5 to about 25 weight percent vinyl acetate but the preferred range is from about 10 to about 18 weight percent. The melt index of these ethylene copolymers may range from about 50 to about 500 but is preferably in the range of about 150 to about 500 to produce lower viscosity adhesives which are easily machined.

It was unobvious and unexpected to find that the ethylene-vinyl acetate copolymers could be incorporated in the polyethylene-based blends of this invention. Because of low compatibility, when molten blends of polyethylene and ethylene-vinyl acetate copolymers are allowed to solidify, the polyethylene crystallizes and excludes the ethylene-vinyl acetate copolymer portion of the blend from the polyethylene spherulites. Thus, blends of polyethylene and ethylene-vinyl acetate copolymers generally have a cheesy nature rather than being tough and flexible. Also blends of polyethylene and ethylene-vinyl acetate copolymer tend to separate into layers when aged in the molten state. However, modified polyethylenes prepared by the methods described have improved compatibility with ethylene-vinyl acetate copolymers, and do not tend to separate in the molten state.

The tackifying resins useful in the adhesive compositions of this invention can be a hydrocarbon resin such as DAC-B hydrocarbon resin prepared according to the process disclosed in U.S. Pat. No. 3,701,760 as well as other hydrocarbon resins, synthetic polyterpenes, rosin esters and the like. One such suitable hydrocarbon tackifying resin is a hydrocarbon resin having a softening point of 130° C. and available commercially as Eastman resin H-130 from Eastman Chemical Products, Inc. Other hydrocarbon tackifying resins can be prepared by the polymerization of monomers consisting primarily of olefins and diolefins and include, for example, the residual by-product monomers resulting from the manufacture of isoprene. These hydrocarbon tackifying resins typically exhibit a ring and ball softening point of from about 80° to 135° C.; an acid number of from about 0 to 2; a saponfication value of less than about 1; and an iodine value of from about 75–100. Examples of such commercially available resins of this type are "Wingtack 95" as sold by the Goodyear Tire and Rubber Co. and the Sta-Tac and Betaprene H resins sold by the Reichhold Chemical Corp.

Also suitable resins are the terpene polymers such as the polymeric, resinous materials including the dimers as well as higher polymers obtained by polymerization and/or copolymerization of terpene hydrocarbons such as the alicyclic, monocyclic, and bicyclic monoterpenes and their mixtures, including allo-ocimene, carene, isomerized pinene, pinene, dipentene, terpinene, terpinoline, limonene, terpentine, a terpene cut or fraction, and various other terpenes. Particularly useful starting materials are terpene mixtures containing at least 20% $\beta$-pinene and/or limonene or dipentene (racemic limonene), and the "sulfate turpentine" obtained as a by-product in the sulfate pulping process.

The polyethylenes are modified polyethylene having saponification numbers of about 3 to 60, about 4 to 10 preferred, prepared by reacting polyethylene with an unsaturated polycarboxylic acid, anhydride or ester thereof by processes also well known in the art, as for example, U.S. Pat. No. 3,856,889. The polyethylene reacted with this unsaturated component can be low molecular weight or degraded polyethylene. The modified polyethylene alone can be used as the polyethylene component or blends of such modified polyethylene with unmodified polyethylene or blends of modified polyethylene and blends of more than one unmodified polyethylene can also be used.

The microcrystalline waxes useful in this invention are waxes having a ring and ball softening point at least 140° F. or higher which are obtained during petroleum refining processes. Such waxes are well known in the art and are readily available commercially.

The modified polyethylenes are employed in an amount of about 5 to 25 percent by weight, preferably 10–15 percent by weight of the adhesive formulation. If more than 25 percent by weight is employed the formulation loses adhesion. The ethylene-vinyl acetate copolymer is used in an amount of 50 to 30 percent by weight, preferably 40 percent. An amount less than 30 percent causes the adhesive formulation to lose adhesion to polyethylene substrates and amounts greater than 50 percent raises the viscosity too high for the adhesive to be used in conventional application equipment. The hydrocarbon resins and polyterpene tackifying resins can be used either alone or in combination.

These tackifying resins can be used in amounts of about 20 percent to about 50 percent by weight of the adhesive composition, preferably about 40 percent by weight. More than 50 percent by weight tackifier provides an adhesive which is too brittle to be used on flexible substrates and less than 20 percent by weight, the adhesive has a lower elevated temperature property and high viscosity. The wax can be used in an amount of 5 percent by weight to 15 percent by weight. If less than 5% wax is present the viscosity of the adhesive is too high and more than 15% the cohesive strength and softening point are lowered so as to have bleed through on nonwoven substrates.

The adhesive compositions of this invention are prepared by blending together the components in the melt at a temperature to about 160° C. to about 200° C. until a homogeneous blend is obtained, approximately 2 hours. Various methods of blending materials of this type are known to the art and any method that produces a homogeneous blend is satisfactory. These components blend easily in the melt, and a heated vessel equipped with a stirrer is all that is required. For example, a Cowles stirrer provides an effective mixing means for preparing these hot-melt adhesive compositions.

In addition to the above-listed components, it is desirable for the hot-melt adhesive composition to contain about 0.1 to about 1.5 percent by weight, preferably about 0.25 percent to 1.0 percent by weight, of one or more stabilizers or antioxidants. Antioxidants that are effective for each of the various components can be used. Such antioxidants include, for example, Ionox 330 [tris(di-t-butyl-p-hydroxybenzyl)-trimethylbenzene], Dalpac 4C2 [6-di(t-butyl)-p-cresol], Naugawhite (alkylated bisphenol), Butyl Zimate (zinc dibutyl dithiocarbamate), Ethyl 702 [4,4'-methylene bis(2,6-di-tert-butyl-phenol)], Irganox 1010 tetrakis[methylene-3-(3',5'-di-t-butyl-4'-hydroxyphenyl)propionate]methane, Cyanox 1212 (American Cyanamid) lauryl stearyl thiodipropionate, and Cyanox LTDP (dilauryl 3,3'-thiodipropionate).

This invention can be further illustrated by the following examples of preferred embodiments thereof, although it will be understood that these examples are included merely for purposes of illustration and are not intended to limit the scope of the invention unless otherwise specifically indicated.

EXAMPLE 1

100 Grams of low density modified polyethylene having a melt viscosity at 150° C. of 4500 cps, a saponification number of 5.0 and Tm of 102° C.; 400 grams of a hydrocarbon tackifier having a Ring and Ball Softening point of 130° C.; 400 grams of ethylene-vinyl acetate copolymer having a melt index at 190° C. of 500 and a vinyl acetate content of 18%; 100 grams of microcrystalline wax; and 2.5 grams of dilauryl dithiodipropionate and 2.50 grams of Irganox 1010 antioxidants are blended in a 5-liter round-bottom flask at 180° C. under nitrogen with stirring for three hours. This blend has a melt viscosity of approximately 2000 cp at 177° C. in a Brookfield Thermosel Viscometer.

EXAMPLE 2

The process described in Example 1 is repeated replacing the modified polyethylene with unmodified polyethylene having a melt viscosity of 4000 cp. at 150° C. The blend had phase separation and therefore is not acceptable for commercial uses. This example shows that unmodified polyethylene does not form useful adhesive for commercial manufacturing operations.

EXAMPLE 3

The process described in Example 1 is repeated except only the modified polyethylene and ethylene-vinyl acetate copolymer and blended together. The blend was too high in viscosity for adequate machining and did not have an adequate short tack time.

The invention has been described in detail with particular reference to preferred embodiments thereof, but it will be understood that variations and modifications can be made within the spirit and scope of the invention.

I claim:

1. An adhesive composition capable of being used as a hot melt adhesive comprising a blend of
   (a) about 5 to 25 percent by weight of at least one modified polyethylene having a saponification number of about 3 to 60 prepared by reacting polyethylene with an unsaturated polycarboxylic acid, anhydride or ester thereof,
   (b) about 50 to 30 percent by weight of at least one ethylene-vinyl acetate copolymer,
   (c) about 50 to 20 percent by weight of at least one tackifier resin selected from the group consisting of hydrocarbon resin, polyterpene resin and rosin ester resin, and
   (d) about 5 to 15 percent by weight of a microcrystalline wax.

2. An adhesive composition according to claim 1 wherein said ethylene-vinyl acetate copolymer contains from about 5 to about 25 weight percent vinyl acetate.

3. An adhesive composition according to claim 2 wherein said modified polyethylene has a melt viscosity of from about 750 to about 100,000 centipoise at 177° C.

4. An adhesive composition according to claim 3 wherein said tackifier resin is a hydrocarbon tackifier resin.

5. An adhesive composition capable of being used as hot melt adhesive comprising a blend of
   (a) about 10 to 15 weight percent of at least one modified polyethylene having a saponification number of about 3 to 60 prepared by reacting polyethylene with an unsaturated polycarboxylic acid, anhydride or ester thereof,
   (b) about 40 weight percent of at least one ethylene-vinyl acetate copolymer,
   (c) about 40 weight percent of at least one tackifier selected from the group consisting of hydrocarbon resin, polyterpene resin or rosin ester resin, and
   (d) about 10 to 15 percent by weight of microcrystalline wax.

6. An adhesive composition according to claim 5 wherein said ethylene-vinyl acetate copolymer contains from about 10 to about 18 weight percent vinyl acetate.

7. An adhesive composition according to claim 6 wherein said modified polyethylene has a melt viscosity of from about 750 to about 100,000 centipoise at 177° C.

8. An adhesive composition according to claim 7 wherein said tackifier resin is a hydrocarbon tackifier resin.

* * * * *